Oct. 31, 1933.    J. D. LANGDON    1,932,702
COMBINED HELICOPTER AND ENGINE
Filed July 14, 1930    2 Sheets-Sheet 1

INVENTOR.
J D Langdon

Oct. 31, 1933.   J. D. LANGDON   1,932,702
COMBINED HELICOPTER AND ENGINE
Filed July 14, 1930   2 Sheets-Sheet 2

INVENTOR.
J. D. Langdon

Patented Oct. 31, 1933

1,932,702

UNITED STATES PATENT OFFICE 1,932,702

COMBINED HELICOPTER AND ENGINE

Jesse D. Langdon, Los Angeles County, Calif.

Application July 14, 1930. Serial No. 467,764

6 Claims. (Cl. 244—19)

My invention relates to helicopters, more especially in regard to engines for rotating a helicopter propeller.

The primary object in my invention is to facilitate the use of a large diameter propeller as required in a helicopter without the usual back leverage against the drive shaft and engine where the distance between the hub and periphery of said propeller is unusually great.

Another object in my invention is to provide a simple mechanism comprising an engine with a minimum of parts by which a helicopter propeller may be driven.

A still further object in my invention is to provide a helicopter propeller which in itself is an engine, eliminating the necessity for a separate mechanism to rotate said helicopter propeller.

The foregoing objects are attained by the mechanism illustrated in the accompanying drawings, it being specifically understood that said drawings are for the purpose of illustration only, and the invention may be changed within the scope of what is claimed.

Other and further objects will appear as the descriptive matter proceeds, as illustrated by the drawings, of which, Fig. 1 is a top view of the combined helicopter and engine propeller embodied in my invention.

Like figures indicate like parts in all the figures of the drawings.

Figure 1:
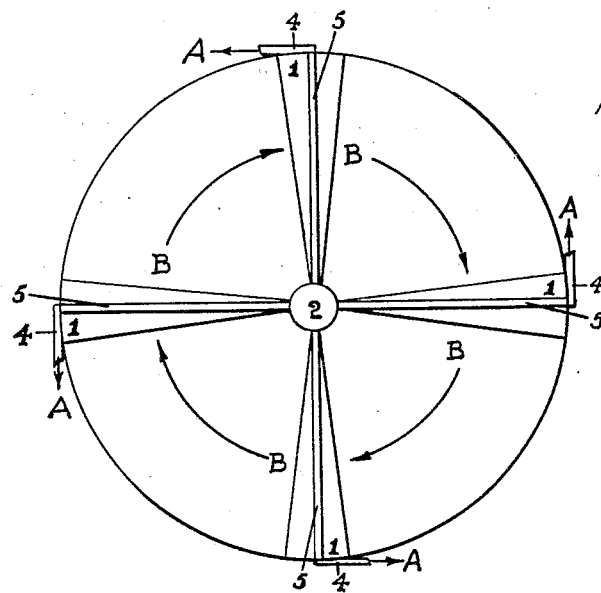

The component parts are propeller blades 1 which radiate from hub 2, which is tubular. A rim 3 having attached thereon vents 4 connected with said tubular hub 2 by tubular spokes 5.

Engine 6 is attached to air compressor 7 which in turn is attached to air compression tank 8. A tubular drive shaft 9 is adapted to serve as a conduit for air pressure.

Figure 2:
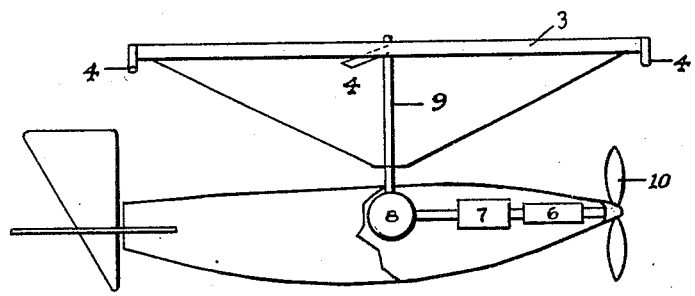
Fig. 2 is a side view with fuselage partly cut away to illustrate the location of a power generating plant as may be used in one method of operating my invention.

The operation of my invention is as follows:

When the structure used is such as is illustrated in Figs. 1 and 2 engine 6 operates compressor 7 which compresses air into compression tank 8, from which the air flows through hollow shaft 9 to hub 2, thence the pressure is distributed to combustion chambers, or vents, 4 through tubular spokes 5, said combustion chambers or vents 4 exhausting in the direction indicated by arrows A, thus forcing the helicopter propeller to rotate in a clockwise direction as indicated by arrows B.

Figure 3:
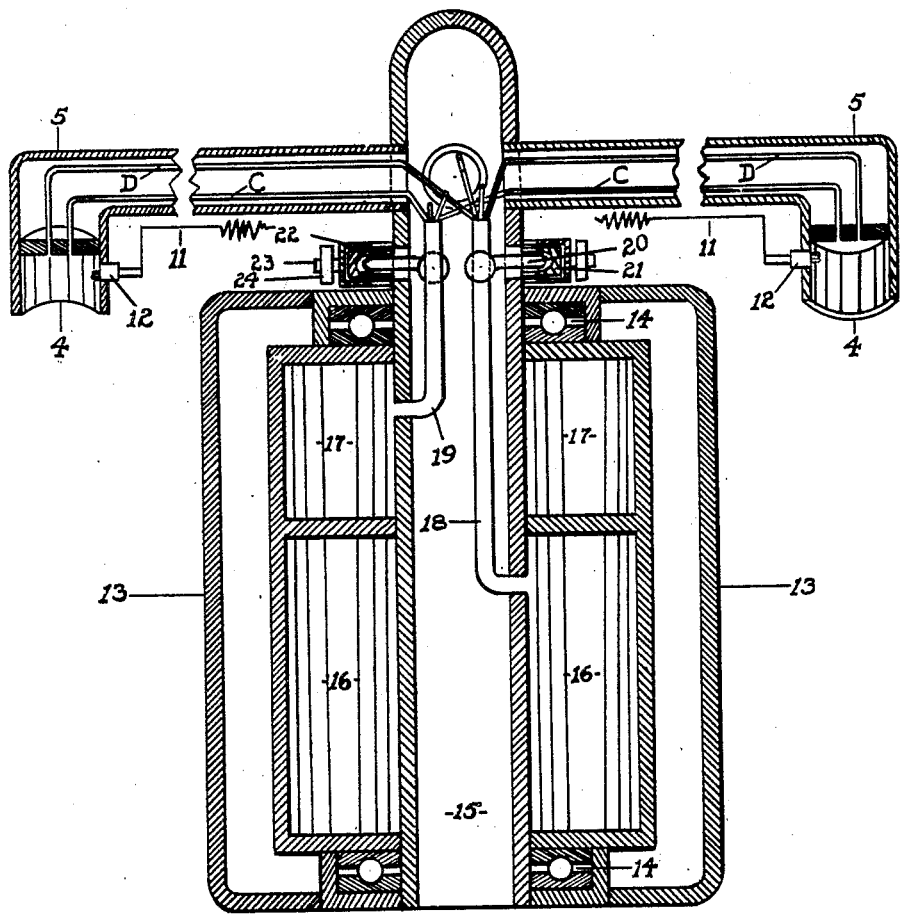
Fig. 3 is a cross sectional view of the combined helicopter and engine which may be preferably used in the structure described as of Fig. 3 and an alternative structure to that shown in Figs. 1 and 2.

It is preferable, however, to operate the helicopter propeller by a self contained engine as illustrated by Fig. 3 as follows:

High tension electrical resistance 11 is carried through a spark plug 12, or other similar sparking device, causing an explosion in combustion chamber 4 when oxygen or air is delivered to tubes C and a suitable explosive material, or fuel, is delivered through tube D, in right proportions to form an explosive mixture in combustion chamber 4, thus exerting an explosive impulse at the end of tubular spokes 5 to rotate tubular shaft 15, which has integral with said shaft two fuel tanks; one fuel tank 16 containing a suitable explosive material, or fuel, to be mixed with the air or oxygen contained in tank 17, this mixture occurring in combustion chamber, or vent, 4. The outlet tube 18 from tank 16 and the outlet tube 19 from tank 17 both have suitable tubular bifurcations C and D leading through the tubular spokes 5 to combustion chamber 4 where the mixture occurs and the explosion takes place.

A supporting frame 13 carries bearings 14, through which is disposed tube 15 (this tube being the equivalent of tube 9 in Figs. 1 and 2), surrounded by tanks 16 and 17 adapted to rotate within said frame 13 which may be suitably attached to any structure within which said combined heliocopter propeller and engine is contained.

Figure 4:
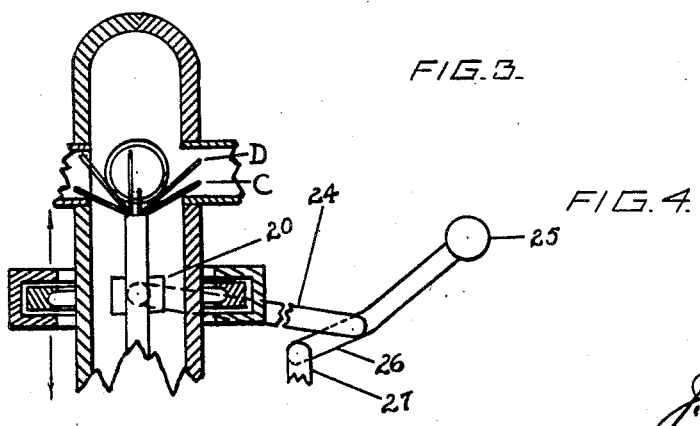
Fig. 4 is a fragmentary cross-section in the opposite direction to that shown in the structure illustrated by Fig. 3, showing in detail the operation of throttle control lever and yoke ring, including means for attachment to supporting frame.

Fig. 4 represents a fragmentary portion of the upper part of Fig. 3, being in cross section and illustrating an arrangement for a throttle control which consists of levers 20 operated through the medium of grooved ring 21, which is supported by an external yoke ring 22 and moved parallel with tube 15 through the medium of two yoke arms 24 operated by handle 25, connected by link 26 and lug 27 to supporting frame 13.

Having described my invention, and that which is new, I claim:

1. A combined helicopter and engine comprising a central shaft, fuel containers combined unitary with said shaft, outlet tubes from said fuel containers, said outlet tubes bifurcating into conduits, a propeller structure, including a hub and a rim, and propeller blades radiating from said hub to said rim, combustion chamber and vent means connected to said conduits and located adjacent to said rim, means to ignite an explosive mixture in said combustion chamber and vent means whereby said propeller is rotated.

2. A combined helicopter and engine comprising a propeller structure, including a central tubular shaft having integral therewith a container for pressure fluid, tubular spokes radiating from said tubular shaft to vents located at the periphery of said propeller structure in combination with a rim encompassing the ends of the blades of said propeller structure, said tubular spokes serving the purpose of conduits for pressure fluid to said vents arranged in a tangential direction from said central shaft, the ends of said vents being disposed at an angle adapted to cause rotation of said propeller structure, means to control the movement of said pressure fluid including a lever mounted on a supporting frame, said frame having a fixed position in relation to the rotation of said propeller structure, comprising a complete engine structure within itself, as described.

3. A combined helicopter and engine for an aircraft comprising a shaft, said shaft forming a self contained storage chamber for pressure producing elements and having unitary therewith conduits adapted to carry said pressure producing elements thru radial bifurcations from said shaft to vents disposed at a suitable angle around said shaft to cause a tractive and rotational effect, said combined helicopter and engine comprising a complete and independent unit for operation in a supporting frame of the aircraft, and including means to control said rotating unit from a fixed position on said supporting frame.

4. A combined helicopter and engine comprising a supporting frame, a tubular combined propeller shaft and container for pressure producing elements, including conduits radiating from said tubular propeller shaft and container to vents including means to cause the rotation of said combined helicopter and engine for tractive effect, also including with the above elements blades radiating from said tubular shaft and container and a common peripheral rim surrounding the ends of said blades.

5. A combined helicopter and engine comprising a central shaft having unitary therewith as a component part of said central shaft, containers, said containers adapted to carry elements to form a combustible mixture, conduits radiating from said central shaft and containers, said conduits adapted to deliver the elements of a combustible nature to combustion chambers located at a distance from said central shaft, including means to continuously ignite a combustible mixture in said combustion chamber, said combustion chambers having vents disposed at an angle adapted to rotate said combined helicopter and engine by explosive force against the atmosphere to exert a lifting effect against a supporting frame included in said combined helicopter and engine.

6. A combined helicopter and engine comprising a single unit for rotation, including containers for pressure producing elements, a central shaft, a throttle control included with conduits for said pressure producing elements, said conduits leading to pressure vents located at a distance from said central shaft, said pressure vents forming combustion chambers and including means to explode said pressure producing elements of a combustible nature, the entire described structure comprising all the elements necessary to cause the rotation of said combined helicopter and engine within a supporting frame, and including a supporting frame, throttle control actuating means mounted on said supporting frame, together with means to actuate from a fixed position throttle control means adapted to rotate as a unit with said combined helicopter and engine as described.

JESSE D. LANGDON.